US012686541B2

(12) United States Patent
Liow

(10) Patent No.: US 12,686,541 B2
(45) Date of Patent: Jul. 21, 2026

(54) CLOSURE DEVICE AND METHOD FOR PRESERVING OXIDIZABLE PRODUCTS

(71) Applicant: Chang Chyan Liow, Windsor, CA (US)

(72) Inventor: Chang Chyan Liow, Windsor, CA (US)

( * ) Notice: Subject to any disclaimer, the term of this patent is extended or adjusted under 35 U.S.C. 154(b) by 238 days.

(21) Appl. No.: 18/525,037

(22) Filed: Nov. 30, 2023

(65) Prior Publication Data

US 2025/0178805 A1 Jun. 5, 2025

(51) Int. Cl.
| | |
|---|---|
| *B65D 51/28* | (2006.01) |
| *B65D 39/00* | (2006.01) |
| *B65D 51/24* | (2006.01) |
| *C12H 1/14* | (2006.01) |

(52) U.S. Cl.
CPC ..... B65D 51/2821 (2013.01); B65D 39/0076 (2013.01); B65D 51/244 (2013.01); B65D 51/245 (2013.01); C12H 1/14 (2013.01); *B65D 2203/04* (2013.01); *B65D 2539/003* (2013.01)

(58) Field of Classification Search
CPC .......... A61M 2205/19; A61M 15/0045; B65D 83/0409; B65D 75/36; B65D 83/0088; B65D 83/0463; B65D 51/2821; B65D 39/0076; B65D 51/244; B65D 51/245; B65D 2203/04; B65D 2539/003; B65D 39/0052; A61J 1/035; C12H 1/14
See application file for complete search history.

(56) References Cited

U.S. PATENT DOCUMENTS

| | | | | |
|---|---|---|---|---|
| 3,578,193 | A * | 5/1971 | Steiner | B65D 39/04 215/214 |
| 3,599,821 | A * | 8/1971 | Eggert | B65D 50/045 215/320 |
| 3,809,273 | A * | 5/1974 | Lehr | B65D 39/16 215/202 |
| 5,503,282 | A * | 4/1996 | Montgomery | B65D 41/3447 215/343 |
| 6,112,920 | A * | 9/2000 | Lahaussois | B65D 50/046 220/281 |
| 11,161,656 | B2 * | 11/2021 | Wang | B65D 51/245 |
| 2007/0102394 | A1 * | 5/2007 | Olsen | B65D 51/2835 215/311 |
| 2009/0101616 | A1 * | 4/2009 | Brennan | B29C 45/44 215/329 |

* cited by examiner

*Primary Examiner* — Kareen K Thomas
(74) *Attorney, Agent, or Firm* — Novel Patent Services LLC

(57) ABSTRACT

A closure device for a container to provide a combined protection of inert gas and oxygen scavenger methods. The closure device comprises a body, a fastening member, one or more plurality of protrusions, a blister, a hollow shaft, and a seal member. The closure device is removably coupled to an open end of the container through a fastening assembly. The fastening assembly includes at least one of friction fit, a snap fit, a screw fit, or any of a variety of fastening mechanisms. The closure device provides a combined protection of inert gas and oxygen scavenger methods. This is beneficial because it prevents nutritional and organoleptic degradation processes of wine through oxidation while aids to preserve the fruitier and fresher aromas and flavors of the wine. The closure device is designed to fit snugly over the neck of the bottle and create an airtight seal.

17 Claims, 9 Drawing Sheets

CLOSURE DEVICE AND METHOD FOR PRESERVING OXIDIZABLE PRODUCTS

The present disclosure relates generally to storage devices and methods for oxygen-sensitive substances, and more particularly to a closure device that provides a double protection for persevering any oxygen-sensitive substance without developing any undesirable odors and flavor profiles.

BACKGROUND

Oxidation can have significant effects on products such as food and beverages, leading to changes in effectiveness, flavor, color, aroma, and overall quality and reduces its shelf life. However, exposure to oxygen can be detrimental for certain foods and beverages. A study demonstrated a rapid decline in the concentration of 3-mercaptohexanol, a compound responsible for tropical and fruity aromas in Sauvignon blanc wines sealed under closures and stored in oxygen-rich environments.

When these products exposed to the atmospheric conditions can cause the products to lose their effectiveness or develop an unpleasant or different taste. For example, once a bottle of aromatic alcoholic beverages such as wines, gins and sake is opened, the alcoholic beverages doesn't last long. Once opened, the shelf life of the alcoholic beverages could be decreased due to atmospheric exposure, which can result in an undesired taste. In general, wine exposed to oxygen loses its original flavor and quality due to degradation. Oxygen triggers chemical reactions and bacterial growth, leading to wine degradation.

Conventional ways to store oxygen-sensitive substances like wine include using corks or stoppers, vacuum preservation, and air displacement. For users who intend to open a bottle of wine and not consume the entire bottle, there are a handful of methods commercially available to extend the opened shelf life of the wine. These can be classified into two general categories: vacuum preservation and "air displacement".

Vacuum preservation methods involve partially removing oxygen from a container to prevent degradation or oxidation and quality of food and other products, such as wine fresh fruits and vegetables. This process creates a partial vacuum that helps to extend the shelf life of food and other products, but it can also alter the taste and texture of some foods. At present there are apparatuses that are used for vacuum preservation such as hand pump vacuum sealers and industrial vacuum sealers for food packaging.

However, the hand pump vacuum sealers are less powerful than the industrial vacuum sealers and therefore can only create a partial vacuum. They can remove air from containers but some oxygen will still be present, which limits the shelf life of foods stored in this way to only for three days. Further, the hand pump vacuum sealers can remove volatile aromatics from food, affecting its taste and smell. This makes hand pump vacuum sealers unsuitable for sealing strongly flavored items like coffee or spices or wine.

Furthermore, the industrial vacuum sealers are a powerful tool that can extend the shelf life of food. However, they are expensive, complex, and not suitable for all products as it can alter the taste and texture of some foods. For example, they are not recommended for vacuum sealing fresh fruits and vegetables that emit ethylene gas, as this gas can cause the fruits and vegetables to ripen prematurely.

Air displacement methods replace the air in the headspace of an opened bottle of wine with an inert gas to prevent oxidation. This is more effective than vacuum preservation, but it is also more expensive and difficult to use.

Oxygen scavengers are employed to remove the presence of oxygen from a wine container. Oxygen scavengers are very effective and will start to react to oxygen immediately upon exposing them to air. However, even after the implementation of an oxygen scavenger preservation method, oxidation-sensitive substances such as wine remains susceptible to oxidation. The oxygen scavengers only become effective after 8 to 72 hours depending on the ambient temperature and composition of the oxygen scavengers, causing a noticeable delay. During this period, the wine remains exposed to oxidation until the oxygen scavenger has fully eliminated the oxygen from the headspace.

Further, even though the oxygen scavengers immediately start to react to oxygen, they can produce unpleasant odors in the wine container. For example, ferrous oxygen scavengers, commonly known as iron powder, offer rapid oxygen removal but can impart undesirable metallic or "rusty" aromas and flavors and rendering the wine "reductive". Additionally, the oxygen scavengers also remove volatile aromas of the wine due to negative pressure caused by the absorption of oxygen.

Both vacuum preservation and air displacement methods can extend the shelf life of opened wine, however, they both have drawbacks. Vacuum preservation can alter the taste of the wine, while air displacement is more expensive and difficult to use. The existing methods for extending the opened shelf life of food, or liquid, or wine are expensive, less convenient, and less effective. Further, the existing methods fail to prevent the food or liquid from developing an undesirable flavor profile. The existing methods are difficult to clean, have risk of cross-contamination, and are expensive. Further, the existing closure device doesn't provide combined protection of inert gas and oxygen scavenger methods.

A prior art U.S. Ser. No. 11/760,546B2 describes a de-oxygenation stopper that is designed to minimize oxygen content in a vessel, allowing wine and other oxygen-sensitive materials to age properly. It has an oxygen scavenging element that removes oxygen molecules and a sealing element that controls oxygen transmission at a desired rate. This can be helpful for preserving foods and beverages that are sensitive to oxygen, such as wine and olive oil. However, the de-oxygenation stopper is not suitable for all types of containers. For example, it cannot be used with containers that have a very narrow neck or that are made of a material that is not compatible with the stopper. In addition, the de-oxygenation stopper controls the oxygen transmission at a desired rate and does not provide a protective layer over the oxidation-sensitive substances. This means any remaining oxygen can still oxidize and degrade the food or beverage. This method often has ferrous oxygen scavengers, commonly known as iron powder, offer rapid oxygen removal but can impart undesirable metallic or "rusty" aromas and flavors, rendering the wine "reductive". Additionally, the oxygen scavengers also remove volatile aromas of the wine due to negative pressure caused by the absorption of oxygen.

In another prior art US20150069085A1 describes devices and methods for extracting fluids from containers sealed with corks or septums. The devices are used to extract and preserve a fluid such as wine stored in a container. The devices could be fixed to the container and injects compressed air or other gases into the container for extracting fluid from the container. The compressed air or other gas may act directly or indirectly on the wine in the container.

However, the devices are expensive and can displace vital volatile aromatics of the wine when the inert gases are injected into the container. In addition, holes on a cork created by a needle of the apparatus during installation can cause wine leaks and may allow the oxygen to enter into the container. Further, there's a risk of bottle explosion due to excessive internal pressure. Moreover, the needle and wine displacement may cross-contaminate between multiple bottles if not properly sanitized after each use. Therefore, employing the apparatus to preserve the fluids like wine in the containers is not deemed a reliable or effective method.

In another prior art US20190270560A1 describe systems and methods that utilize an oxygen scavenging agent coupled to a sealing device to remove oxygen from the headspace of a container, effectively preserving oxidizable substances like liquids or foodstuffs. The oxygen scavenging agent removes the oxygen without significantly reducing the pressure in the headspace, preventing adverse effects on the flavor of the substance, such as wine. However, the described systems and methods only uses oxygen scavenging agent to remove oxygen and does not provide any protective layer over the oxidation-sensitive substances. This means any remaining oxygen can still oxidize and degrade the food or beverage. Further, the device is bulky, which can make it difficult to store and use. This method often has ferrous oxygen scavengers, commonly known as iron powder, offer rapid oxygen removal but can impart undesirable metallic or "rusty" aromas and flavors, rendering the wine "reductive". Additionally, the oxygen scavengers also remove volatile aromas of the wine due to negative pressure caused by the absorption of oxygen.

In another prior art U.S. Pat. No. 4,473,174A discloses a device for preserving and dispensing wine from a bottle. The device includes a stopper assembly that is inserted into the neck of the bottle and a removable cap assembly. The cap contains a chamber that houses a pressurized gas cartridge. The stopper assembly has a valve with three positions: off, vent, and pressurize. In the pressurize position, gas from the cartridge is released into the bottle to create an inert atmosphere. In the vent position, excess pressure in the bottle can be released. A second valve in the stopper assembly controls a spout from which wine is dispensed. However, the device is expensive, complex, and not suitable for all products as it can alter the taste and texture of some foods.

Yet another prior art U.S. Pat. No. 4,475,576A discloses a convenient oxygen purging system for bottled wines is provided using a counter-top inert gas bottle housing with a depending contact-operated gas dispensing head. A separate stopper fits into the opened mouth of a wine bottle. The stopper has a valved port system such that when pressed against the inert gas dispensing head, the inert gas is blown inside the wine bottle, expelling the air from the bottle through an evacuation port and replacing the air with the inert gas. However, the device is expensive, bulky and complex. Further, the device doesn't used oxygen scavenging agent to remove oxygen from the wine bottle.

Further, yet another prior art U.S. Ser. No. 10/220,991B2 discloses a system and methods for de-oxygenation of a closed container. The system includes a sealing device that can be attached and sealed to the vessel. The sealing device is comprised of a first end, a second end, and a sidewall extending between them, and includes a channel that passes between the two ends. The system also includes a member or a canister containing an oxygen-scavenging agent, such as a sachet, that extends partially into the channel of the sealing device. When the sealing device is bound to the vessel, the oxygen scavenging agent is in fluidic contact with the headspace of the vessel, enabling it to extract oxygen and protect the oxygen-sensitive substance. However, the existing sealing device may also remove volatile aromas of the wine due to negative pressure caused by the absorption of oxygen. Further, the existing system and methods only utilize the oxygen-scavenging agent to eliminate oxygen from the sealed container, which reduces the efficiency of oxygen removal and cannot completely remove oxygen from the container.

Researchers have conducted several studies on beverage packaging using different materials. One study focused on orange juice packaging and found that orange juice stored in monolayer PET bottles with an oxygen scavenger, liquid nitrogen in the headspace, and an aluminum foil seal in the screw-cap had a shelf life of nine months at 4° C. and nearly eight months at 25° C. This study also indicated that the color stability and shelf life of orange juice could be extended by lowering the storage temperature and preventing oxygen permeation through the packaging.

Therefore, there is a need for a closure device that provides a double protection for persevering any oxygen-sensitive substance without developing any undesirable odors and flavor profiles. There is also a need for a closure device that uses a less aggressive de-oxygenation agent, which results in fruitier and fresher wines without any undesirable odors. There is also a need for a closure device, which is specifically tailored for vessels like wine bottles.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to a closure device for a container. In one embodiment herein, the closure device provides a combined protection of inert gas and oxygen scavenger methods. The closure device comprises a body, a fastening member, a plurality of protrusions, a blister, a hollow shaft, and a seal member. The closure device is removably coupled to an open end of the container through a fastening assembly that includes at least one of friction fit, a snap fit, a screw fit, or any of a variety of fastening mechanisms.

In one embodiment, the body defines a channel or a chamber that is configured to store one or more primary gases and at least one absorbent material. In one embodiment, the fastening member is disposed circumferentially on an outer surface of the body. The fastening member is configured to create an airtight seal for the container upon insertion of the closure device. In one embodiment, the fastening member is of a material that includes at least one of plastic, silicone rubber, and any flexible polymers. The fastening member comprises the protrusions that are extended outward radially from a surface of the fastening member. The protrusions are engaged with an interior surface of the container to ensure the airtight seal for the open end of the container.

In one embodiment, the blister is positioned on one end of the body, wherein the blister is connected to a hollow shaft, and the hollow shaft contains at least one secondary gas. In specific, the blister is configured with an indicator unit indicating the presence of oxygen in the container. The indicator unit includes at least one of a display with an oxygen sensor and an oxygen indicator dye to measure oxygen levels present within a headspace of the container.

In one embodiment, the seal member is disposed at a bottom of the body. The seal member is configured to be broken by the hollow shaft through the blister for releasing the primary gases, and the secondary gas from the body and the hollow shaft into the container to form a protective barrier and expose the absorbent material to the headspace of the container, In one embodiment, the body, the blister, and the hollow shaft are made of a material that includes at least one of plastic, silicone rubber, metal, natural cork, and synthetic cork. Further, the body, the blister, and the hollow shaft are made of plastic that includes at least one of polyethylene terephthalate (PET), high-density polyethylene (HDPE), thermoplastic elastomer (TPE), polypropylene (PP), ethylene vinyl alcohol copolymer (EVOH), and polyamide (PA).

The closure device uses inert gases, such as primary and secondary gases, which are heavier than the oxygen, as the density of oxygen is 1.331 $kg/m^3$. The inert gases include at least one of argon gas, which has a density of 1.661 $kg/m^3$, krypton gas, which has a density of 3.74 $kg/m^3$, xenon gas, which has a density of 5.86 $kg/m^3$, radon gas, which has a density of 9.73 $kg/m^3$ and carbon dioxide gas, which has a density of 1.842 $kg/m^3$. In a preferred embodiment, the at least one or more primary gases comprise argon gas and the secondary gas is carbon dioxide. In one embodiment, the absorbent material that includes at least one of metal-based substance, and non-ferrous absorbent material. In the case, the absorbent material is a non-ferrous absorbent material. Then, the non-ferrous absorbent material reacts with the oxygen and absorb within from the container to release carbon dioxide, which functions as the secondary inert gas to form the protective barrier with the primary gases.

An embodiment of the first aspect wherein a method for de-oxygenation of the container by the closure device. In first step, the closure device is inserted into the open end of the container by inserting the body into the open end of the container. Next, the blister is pressed or actuated to push the hollow shaft in a downward direction to penetrate the seal member by the hollow shaft. In one embodiment, the blister is actuated upon detection of oxygen within the container beyond a threshold level.

Next, as the seal member is broken, the primary gases from the body, and the secondary gas from the hollow shaft are released into the headspace of the container to form the protective barrier within the container. Further, the absorbent material is exposed within the headspace for absorbing oxygen from the container.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

DETAILED DESCRIPTION

Figure 1A:
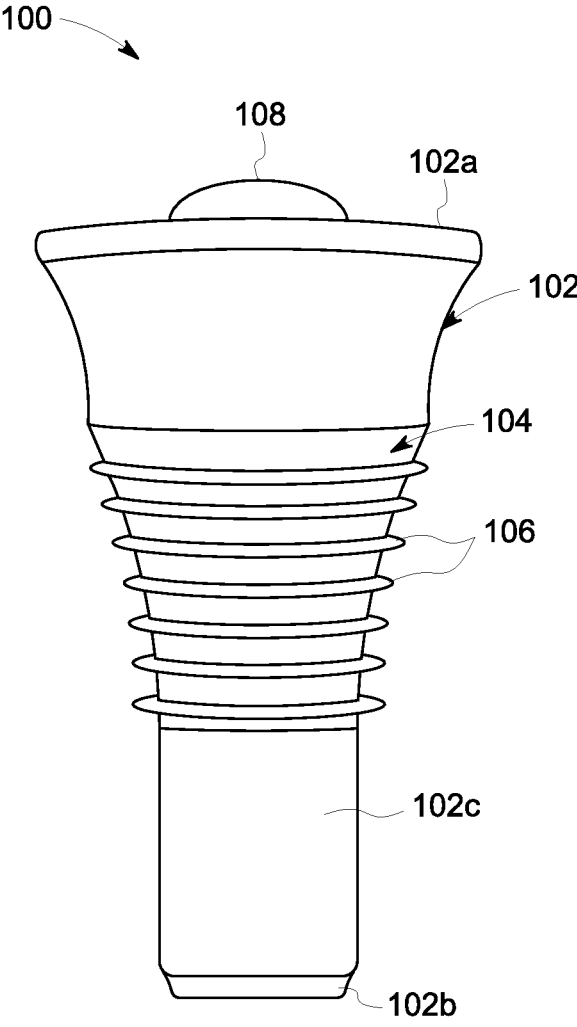
FIG. 1A illustrates a perspective front view of a closure device, in accordance with embodiments of the invention.

Reference will now be made in detail to the present preferred embodiments of the invention, examples of which are illustrated in the accompanying drawings. Wherever possible, the same reference numerals are used in the drawings and the description to refer to the same or like parts.

FIGS. 1A-3 refer to perspective views of a closure device 100 for a container 10. In one embodiment herein, the closure device 100 is configured to provide a combined protection of inert gas and oxygen scavenger methods. The closure device 100 comprises a body 102, a fastening member 104, a plurality of protrusions 106, a blister 108, a hollow shaft 110, a seal member 112, and an openable cap 114. In one embodiment herein, the closure device 100 ensures the airtight seal when disposed on the container 10 to preserve liquids and other items, which degrade when exposed to oxygen for a period of time through a protective barrier and at least one absorbent material against oxidation.

In one embodiment, the container 10 includes, but is not limited to, wine bottles, reusable food storage containers, and other vessels. In another embodiment, the closure device 100 described herein can be applied to any oxygen-sensitive substance for which preservation or storage is desired. For example, wine, foodstuffs, other liquids, pharmaceuticals or drugs, chemicals, paints, adhesives, or any of a variety of materials can be contemplated.

Figure 3:
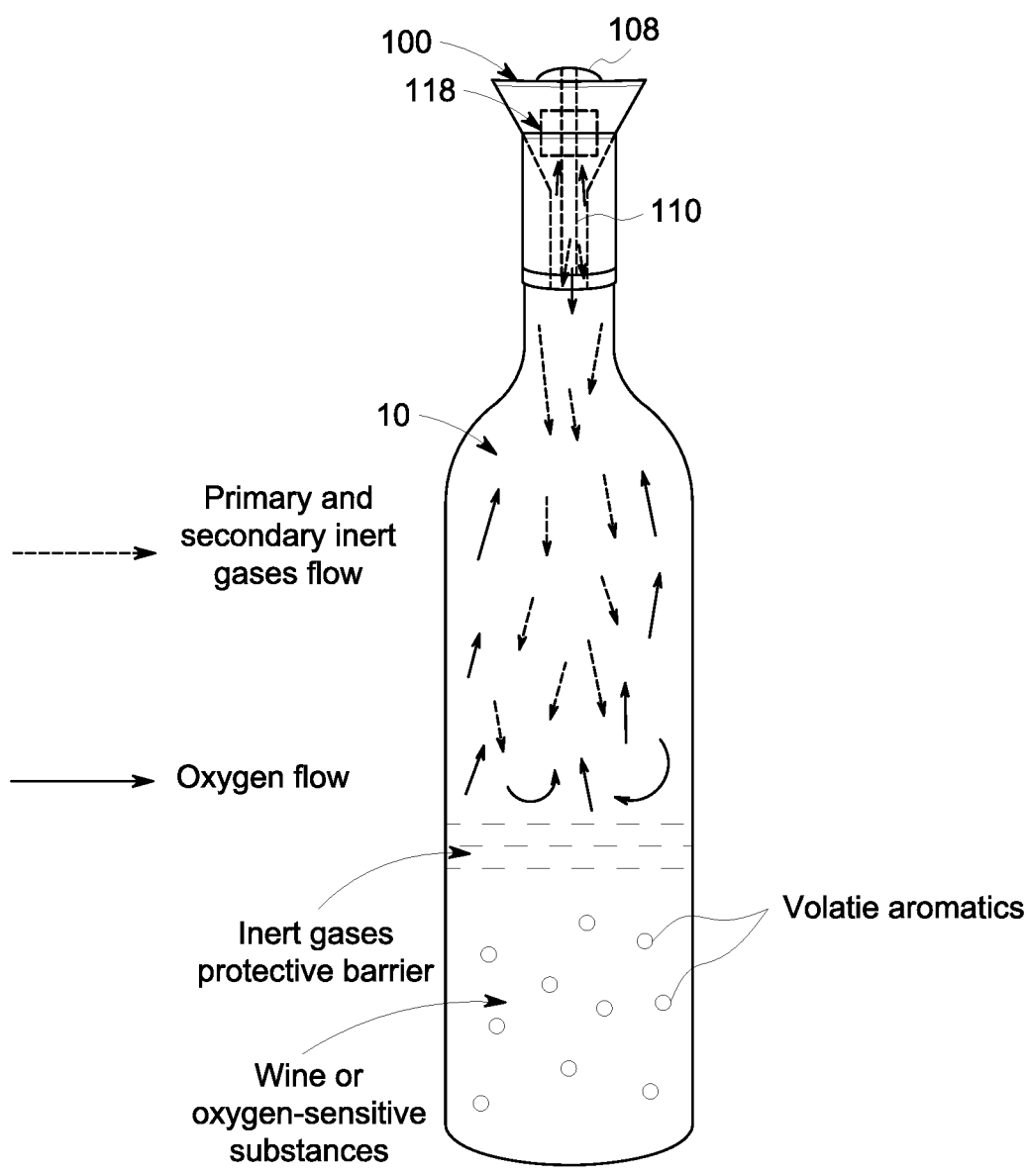
FIG. 3 illustrates a perspective view of the closure device inserted in a container, in accordance with embodiments of the invention.

In one embodiment herein, the closure device 100 is removably coupled to an open end of the container 10 through a fastening assembly, as shown in FIG. 3. The fastening assembly includes at least one of a friction fit, a snap fit, a screw fit, or any of a variety of fastening mechanisms.

In another embodiment, the friction fit is a type of fastening assembly that relies on the friction between two surfaces to hold them together. In the case of the closure device 100, the friction fit could be created between the fastening member 104 and the inside of the open end of the container 10.

In another embodiment, the snap-fit is a type of fastening assembly that uses a series of snaps to hold two surfaces together. In the case of the closure device 100, the snap-fit could be created between the fastening member 104 and the open end of the container 10. The snap-fit could be used to couple the closure device 100 to the open end of a reusable food storage container.

In another embodiment, the screw fit is a type of fastening assembly that uses a screw to hold two surfaces together. In the case of the closure device 100, the screw fit could be created between the fastening member 104 and the open end of the container 10. In some embodiments, the fastening assembly include a bayonet fit, a push-fit, and a magnetic fit.

In some embodiments, the closure device 10 can have a lid, cap, or cover that attaches to the container 10. The lid or cap can be square, rectangular, circular, triangular, or any other shape that matches the cross-sectional shape of the container 10. The lid or cap can be attached to the container 10 by snapping it on, pushing it on, or screwing it on.

In some embodiments, the lid or cap is removably coupled to the container 10 by snap or friction fit or can include threads for threaded engagement with complementary threads formed on the container body.

Figure 1B:
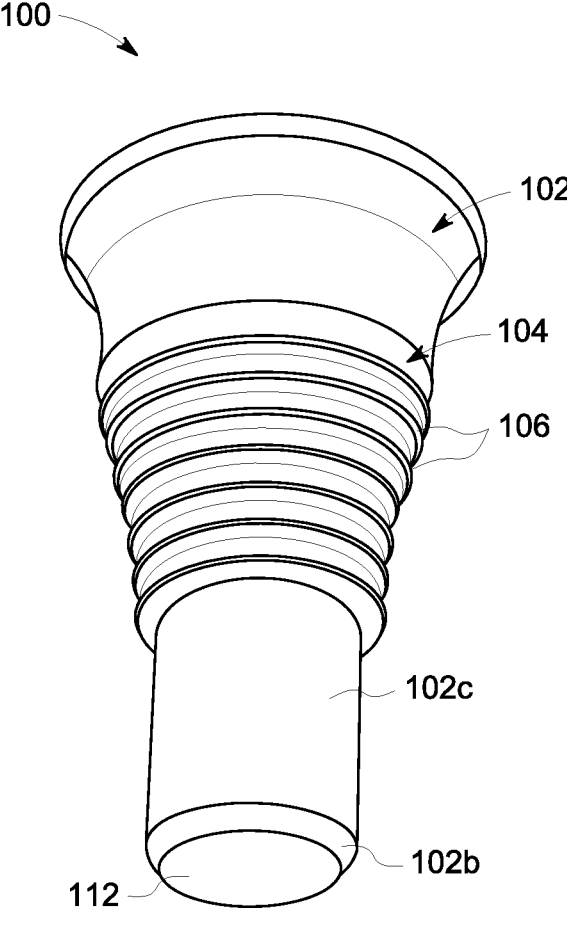
FIG. 1B illustrates a perspective bottom view of the closure device, in accordance with embodiments of the invention.
Figure 1C:
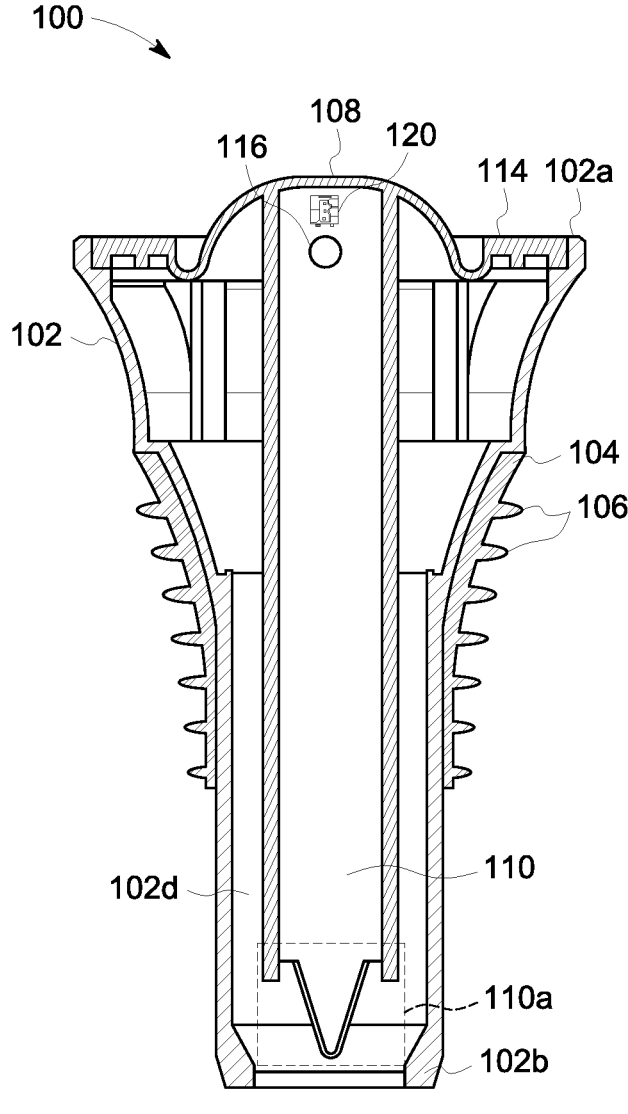
FIG. 1C illustrates a sectional view of the closure device, in accordance with embodiments of the invention.

In one embodiment, the body 102 defines a channel or a chamber 102d that is configured to store one or more primary gases and at least one absorbent material. The body 102 is a cylindrical gas chamber that comprises a first end 102a, a second end 102b that is opposite from the first end 102a, and a sidewall 102c extending between the first end 102a and the second end 102b for storing the primary gases and the absorbent material. In one embodiment, the body 102 has a substantially cylindrical or frustoconical sidewall 102c extending between its first end 102a and the second end 102b, such as a cork or stopper shaped closure device 100, as shown in FIGS. 1A-1B. In one embodiment, the openable cap 114 is detachably attached to the first end 102a of the closure device 10, as shown in FIG. 1C. The openable cap 114 is configured to be removed from the body 102 allowing for the absorbent material in the chamber 102d to be replaced. The openable cap 114 is detachably attached to the first end 102a through a fit that includes at least one of a friction fit, a snap fit, a screw fit, and a pivotal fit thereof.

In one embodiment, the absorbent material is either a de-oxygenation agent or an oxygen scavenging agent. The absorbent material that includes at least one of metal-based substance and non-ferrous absorbent material. The absorbent material is stored in the body 102 in a form that includes a sachet, a filament, and a granular agent. In specific, the absorbent material is packed inside a gas permeable and waterproof package.

In one embodiment, the fastening member 104 is circumferentially extended around an outer surface of the body 102. In specific, the fastening member 104 is fixed on the sidewall 102c of the body 102. The fastening member 104 is configured to create an airtight seal for an open end of the container 10 upon insertion of the closure device 100 through the open end. In one embodiment, the fastening member 104 is a gasket made of a material that includes at least one of plastic, silicone rubber, and any flexible polymers. The fastening member 104 comprises the protrusions 106 that are extended outward radially from a surface of the fastening member 104. The protrusions 106 are engaged with an interior surface of the container 10 to ensure the airtight seal for the open end of the container 10.

In another embodiment, the fastening member 104 could have a series of snaps that would fit into corresponding grooves on the open end of the container 10. In another embodiment, the fastening member 104 would have a threaded screw that would screw into a threaded hole in the open end of a wine bottle.

In one embodiment, the blister 108 is positioned on at one end of the body 102. The blister 108 is connected to the hollow shaft 110, and the hollow shaft 110 is secured within the body 102. In one embodiment, the hollow shaft 110 contains at least one secondary gas and is configured to penetrate the seal member 112, which is disposed at a bottom of the body 102, upon pressing of the blister 108. Further, the hollow shaft 110 is configured with a puncturing member 110a to puncture the seal member 112 and releasing the primary and secondary gases and into the container 10. Due to the penetration action, the primary gases from the chamber 102d and the secondary gas from the hollow shaft 110 are released into the container 10 through at least one perforation 116 to form the protective barrier against oxidation within the container 10, and expose the absorbent material for absorbing oxygen from a headspace of the container 10.

In one embodiment, the blister 108 is configured with an indicator unit 120 indicating the presence of oxygen with the container 10, as shown in FIG. 1C. The indicator unit 120 includes at least one of a display with an oxygen sensor, and an oxygen indicator dye to measure oxygen levels present within a headspace of the container 10.

In one embodiment, the indicator unit 120 is placed inside the blister 108, and is configured to detect the presence of oxygen up to 0.01%.

In another embodiment, the absorbent material can be used to remove oxygen from the headspace of the container 10 through a chemical reaction. Metal-based absorbers, such as iron powder and sodium chloride, remove oxygen by reacting with the oxygen to form metal oxides. Other metal absorbers include elemental iron, iron oxide, iron hydroxide, iron carbide, nickel, tin, copper, and zinc. Metal absorbers are typically in the form of a powder to increase surface area. Other suitable absorbent materials include ascorbic acid, sodium ascorbate, catechol, phenol, activated carbon, polymeric materials incorporating a resin and a catalyst, ferrous carbonate, sodium hydrogen carbonate, and citrus or citric acid.

In one embodiment, the hollow shaft 110 is a thin elongated tube that contains the inert gas. The hollow shaft 110 is connected to the blister 108 at one end and to the seal member 112 at the other end. When the blister 108 is depressed, the hollow shaft 110 is forced into the seal member 112, puncturing the seal member 112 and releasing the inert gas into the container 10.

In one embodiment, the seal member 112 is disposed at a bottom of the body 102. The seal member 112 is configured to be broken by the hollow shaft 110 through the blister 108 for releasing the primary gases, and the secondary gas from the body 102 and the hollow shaft 110 into the container 10 to form the protective barrier and expose the absorbent material to the headspace of the container 10.

In one embodiment, the hollow shaft 110 is configured with one or more perforations 116 at the upper portion to facilitate unrestricted movement of oxygen into the body 102, as shown in FIG. 1C. The perforations 116 of the hollow shaft 110 are configured to allow oxygen to flow into the body 102 from the container 10 once the seal member 112 is broken.

In one embodiment, the seal member 112 is a thin piece of material that is disposed at the bottom of the body 102. The seal member 112 is responsible for preventing the inert gas from escaping from the body 102. The seal member 112 can be made of a variety of materials that include, but not limited to, rubber, silicone, metal foil, paper, and polymer thereof.

In another embodiment, the seal member 112 is detachably attached to the second end 102b of the body 102 through an attachment assembly. In another embodiment herein, the attachment assembly includes an adhesive. The seal member 112 is connected to the second end 102b of the body 102 using the adhesive. Once, the seal member 112 is broken, the broken seal member 112 is manually separated from the body 102, and a new seal member 112 attached to the body 102 using the adhesive.

In another embodiment, the seal member 112 comprises at least one connector. The connector is configured to detachably connect the seal member 112 with the second end 102b of the body 102. In some embodiments, the seal member 112 is connected to the second end 102b of the body 102 an attachment assembly such as, but not limited to, clips, clamps, and the like.

In another embodiment, the closure device 100 is inserted into the container 10, with the bottom of the body 102 exposed to the headspace of the container 10. The inert gases are released into the container 10, by breaking the seal member 112 forming a protective barrier within the container 10. The absorbent material chemically reacts with oxygen to remove it from the headspace of the container 10.

In one embodiment, a tip of the puncturing member 110a is placed on the seal member 112, as shown in FIG. 1C. The blister 108 is depressed to push the hollow shaft 110 into the seal member 112 for puncturing the seal member 112 and releasing the inert gas into the container 10. The seal member 112 can be made of a variety of materials that include, but not limited to, rubber, silicone, metal foil, paper, and polymer thereof. Therefore, the breaking action may also depend of the type of materials used to make the seal member 112.

In another embodiment, the blister 108 is a rotatable knob that is connected to the openable cap 114 through a plurality of threads. To puncture the seal member 112 and release the inert gas into the container 10, the blister 108 is rotated to move the hollow shaft 110 rotatably in downward direction. In another embodiment, the blister 108 is firmly attached to the openable cap 114 through a series of threads, establishing a secure and rotational connection. As the blister 108 is turned clockwise, it causes the hollow shaft 110 to move downward in a controlled manner, enabling the puncturing member 110a to penetrate the seal member 112 and create a larger hole in the seal member 112.

Once the puncturing member 110a has successfully pierced the seal member 112, the inert gases stored within the body 102 and the hollow shaft 110 is released into the container 10. The downward movement of the hollow shaft 110 creates a direct pathway for the inert gases to flow from the body 102 and the hollow shaft 110 into the container 10, effectively displacing any remaining oxygen and establishing an inert atmosphere. In one embodiment, the hollow shaft 110 is configured with the perforations 116 for allowing oxygen to flow into the body 102 from the container 10 once the seal member 112 is broken.

In another embodiment, the puncturing member 110a is placed under the seal member 112 and use a leverage of the hollow shaft 110 to lift the seal member 112 up and away from the second end 102b. In order to lift the seal member 112 up and away from the second end 102b, the puncturing member 110a is placed under the seal member 112. A downward pressure is applied to the hollow shaft 110 through the blister 108. This downward pressure causes the puncturing member 110a to pry the seal member 112 up and away from the second end 102b. The leverage of the hollow shaft 110 is used to amplify the force applied to the puncturing member 110a. The lifting of the seal member 112 creates a gap between the seal member 112 and the second end 102b. This gap allows the inert gases to flow from the hollow shaft 110 into the container 10.

In some embodiments, pressing down on the blister 108 will push the hollow shaft 110 against the seal member 112 and remove it from the body 102. This allows the primary and secondary gases to escape into container 10, and creates a path for oxygen to escape from the container 10. Alternatively, a rupturable seal may also be used in this embodiment.

In some embodiments, the blister 108 is an electric switch that is electrically coupled to the puncturing member 110a and a battery unit. The puncturing member 110a is a heating element that is in contact with the seal member 112. When the blister 108 is pressed, it activates the battery unit and heats the puncturing member 110a. This causes the puncturing member 110a to burn a hole in the seal member 112 as it comes into contact with it. The heat generated by the puncturing member 110a is very small but is sufficient to break the seal member 112 without causing any damage to the contents inside the container 10.

In one embodiment, the body 102, the blister 108, and the hollow shaft 110 are made of a material that includes at least one of plastic, silicone rubber, metal, natural cork, and synthetic cork. Further, the body 102, the blister 108, and the hollow shaft 110 are made of plastic that includes at least one of polyethylene terephthalate (PET), high-density polyethylene (HDPE), thermoplastic elastomer (TPE), polypropylene (PP), ethylene vinyl alcohol copolymer (EVOH), and polyamide (PA).

In one embodiment, the closure device 100 uses inert gases, such as primary and secondary gases, which are heavier than the oxygen, as the density of oxygen is 1.331 $kg/m^3$. The inert gases include at least one of argon gas, which has a density of 1.661 $kg/m^3$, krypton gas, which has a density of 3.74 $kg/m^3$, xenon gas, which has a density of 5.86 $kg/m^3$, radon gas, which has a density of 9.73 $kg/m^3$ and carbon dioxide gas, which has a density of 1.842 $kg/m^3$. In a preferred embodiment, the at least one or more primary gases comprise argon gas and the secondary gas is carbon dioxide. In one embodiment, the primary and secondary gases are all over the body 102 and the hollow shaft 110.

In some embodiments, the most common food-safe absorbent material is an iron powder with sodium chloride. It works by chemically reacting with oxygen to remove it from food packaging. In specific, the absorbent material is packed inside a gas permeable and waterproof package. The moisture in the air starts to seep into the iron particles of the absorbent material once the seal member 112 is broken. In some embodiments, the absorbent material removes almost all of the unwanted oxygen from the headspace of the container 10 sealed by the closure device 100 in a short time. This prevents the oxygen from damaging the substance inside. This method selectively removes oxygen, which prevents the food or liquid from oxidative degradation. This is different from vacuum sealing a wine bottle, which reduces the partial pressure in the container 10 by a relatively small amount.

In another embodiment, the closure device 100 consists of the hollow shaft 110 that is present in an enclosed space of the container 10. The closure device 100 prevents material wastage, ensures maximum effectiveness, and avoids cross-contamination. The closure device 100 has a double action preservation system. The closure device 100 uses inert gases to protect the exposed surface of oxygen-sensitive materials and different types of oxygen scavengers to remove oxygen within flexible timeframes. The closure device 100 also has an oxygen presence indicator that informs users about the effectiveness of the product before using the product.

In some embodiment, the closure device 100 can be designed in various shapes and sizes, depending on the shape and size of a nozzle of the container 10. The closure device 100 is capable for safeguarding any oxygen-sensitive food and beverage items, such as wine, milk, pizza dough, meatloaf, and curries thereof. The closure device 100 releases gases and elements to activate chemical reactions or to protect elements from chemical reactions in an enclosed environment.

In some embodiments, the closure device 100 utilizes a minimal amount of inert gases and restricts the utilization of ferrous oxygen absorbent that can impart undesirable metallic or "rusty" aromas and flavors and rendering the wine "reductive". This aids to prevent negative pressure build-up inside the container 10, which can lead to displacement of vital volatile aromatics. The closure device 100 uses inert gases to protect wine and other oxygen-sensitive products from oxidation without competing with the absorbent material to consume oxygen in the headspace of the container 10.

FIGS. 2A-2D refer to perspective views of the openable cap 114, and the body 102 that defines the channel or the chamber 102d of the closure device 100. The closure device 10 has the openable cap 114 that attaches to the first end 102a of the closure device 10. The openable cap 114 comprises the blister 108 and the hollow shaft 110. The openable cap 114 can be square, rectangular, circular, triangular, or any other shape that matches the cross-sectional shape of the closure device 10. The openable cap 114 can be attached to the closure device 10 by snapping it on, pushing it on, or screwing it on.

Figure 2A:
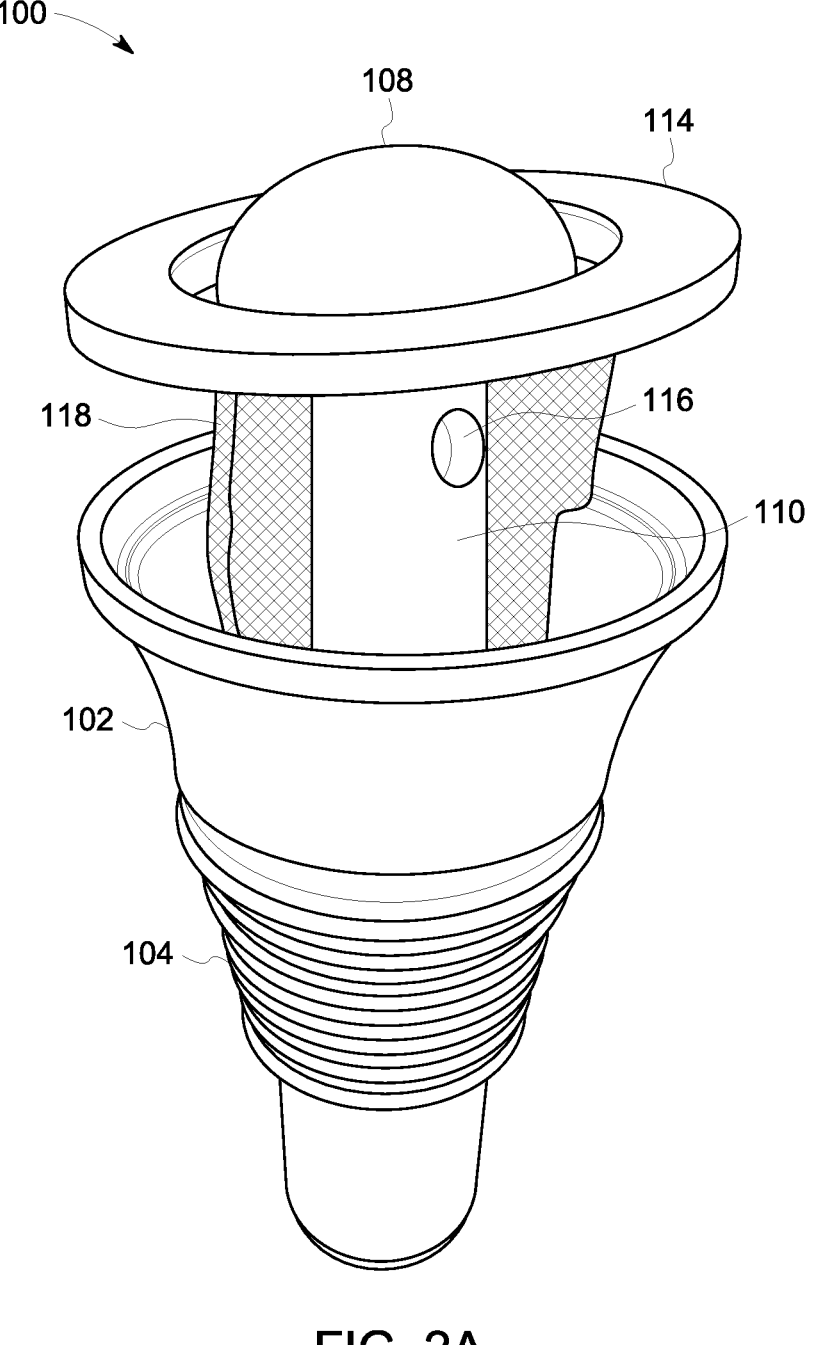
FIG. 2A illustrates a perspective view of an opened closure device, in accordance with embodiments of the invention.

The openable cap 114 can be removed to replace the used absorbent material 118 with new absorbent material. This is important because the absorbent material 118 will eventually become saturated and will no longer be effective at removing oxygen. The upper portion of the hollow shaft 110 is configured with the perforations 116 that facilitate unrestricted movement of oxygen into the body 102, where the absorbent material 118 are housed within a packaging unit, as shown in FIG. 2A. The perforations 116 allow oxygen to flow into the body 102 from the container 10. This is important because the absorbent material 118 needs oxygen to function properly.

Figure 2B:
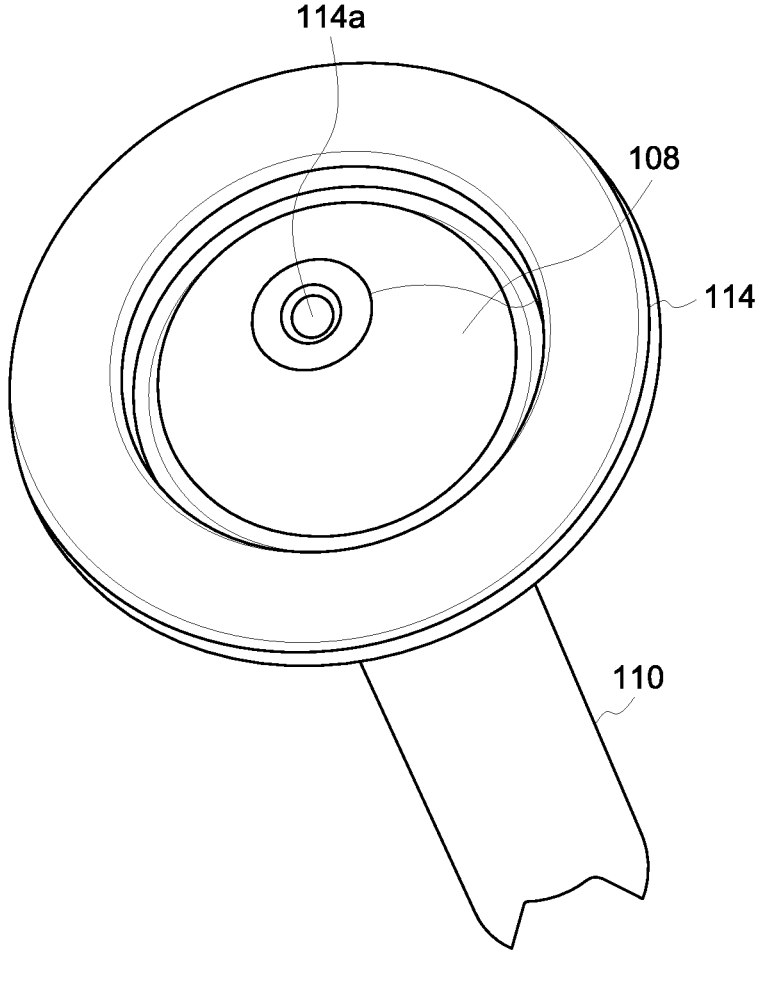
FIG. 2B illustrates a perspective top view of an openable cap with a blister that is attached with a hollow shaft of the closure device, in accordance with embodiments of the invention.

The openable cap 114 includes a one way valve 114a at the top to inject inert gases into the body 102, as shown in FIG. 2B. The one way valve 114a is configured to allow the inert gases to be injected into the body 102. In one embodiment, the one way valve 114a aids to displace any oxygen that is already in the body 102. Further, the one way valve 114a creates a positive pressure inside the body 102, which aids to prevent oxygen from entering the body 102.

Figure 2C:
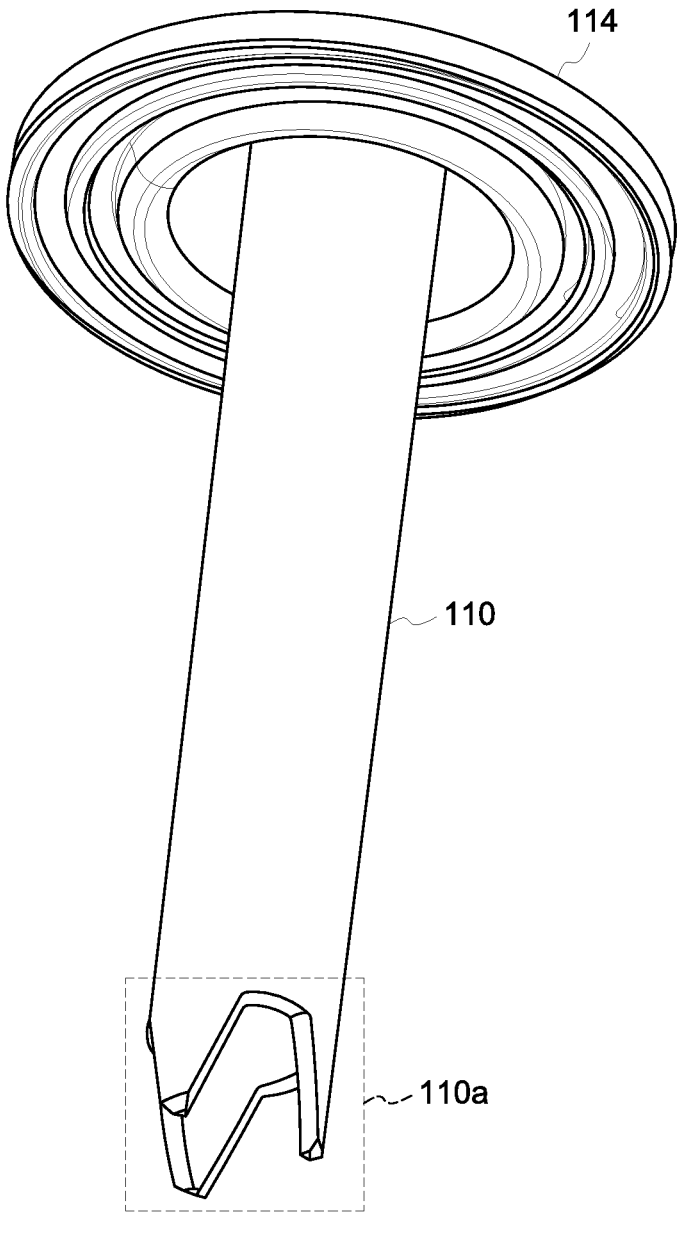
FIG. 2C illustrates a perspective bottom view of the hollow shaft of the closure device, in accordance with embodiments of the invention.
Figure 2D:
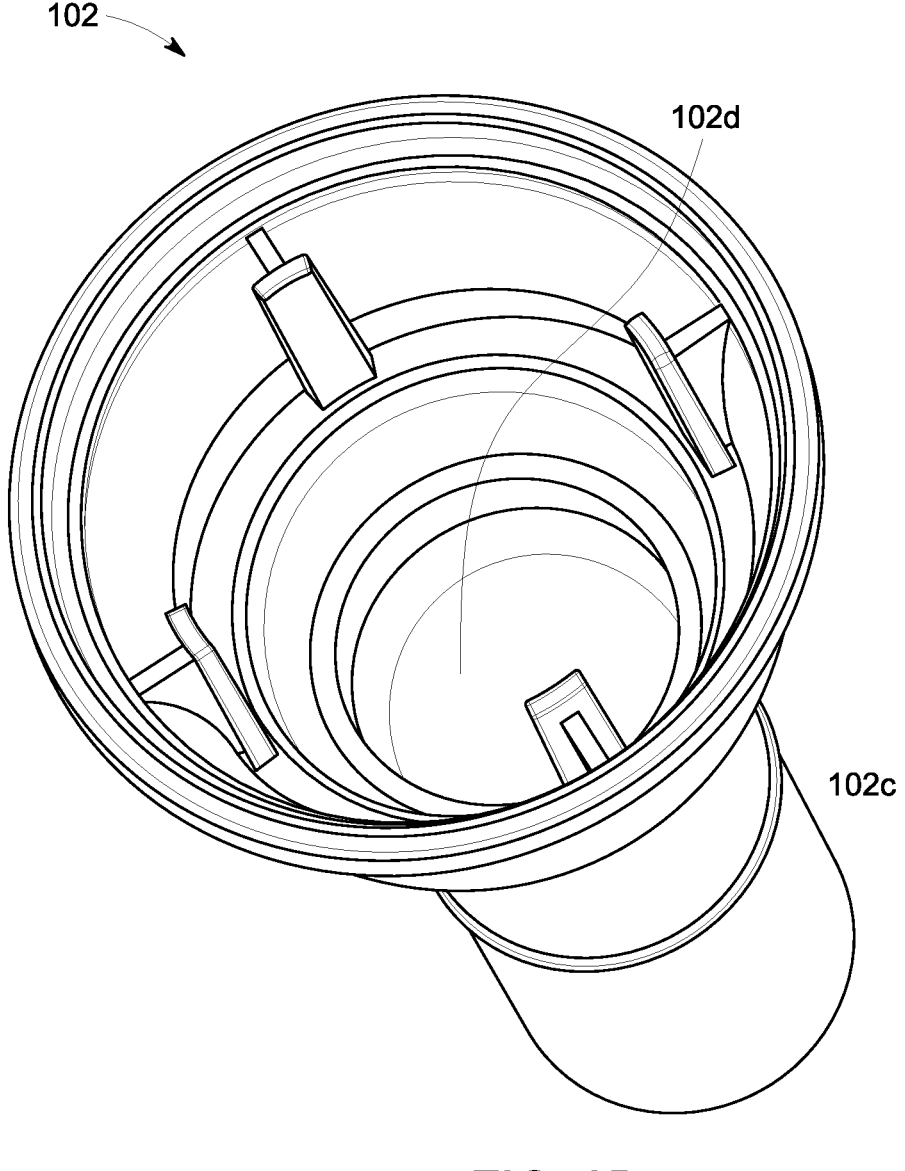
FIG. 2D illustrates a perspective view of uncovered body of the closure device, in accordance with embodiments of the invention.

Referring to FIG. 2C, the hollow shaft 110 is configured with the puncturing member 110a. The puncturing member 110a is configured to puncture the seal member 112 and releasing the inert gas into the container 10.

In another embodiment, the hollow shaft 110 serves as a conduit for the inert gas to enter the container 10. The puncturing member 110a is configured to pierces through the seal member 112 when the blister 108 is pressed, allowing the inert gases to flow freely into the container 10. The puncturing member 110a is typically a sharp, pointed protrusion integrated at bottom of the hollow shaft 110. The puncturing member 110a is design to penetrate the seal member 112. Once the seal member 112 is punctured, the inert gases are able to flow through the hollow shaft 110 and into the container 10, effectively displacing any remaining oxygen and creating an inert atmosphere.

In another embodiment, the hollow shaft 110 is configured with different types of puncturing member 110a that includes, but not limited to, a needle-type puncturing member, or a slit-type puncturing member, or a saw-tooth puncturing member or the likes. In another embodiment, the needle-type puncturing member has a sharp, pointed tip that is similar to a needle. The needle-type puncturing member is often used to puncture thin, pliable materials such as plastic films. In another embodiment, the slit-type puncturing member has a sharp, blade-like edge that is used to make a slit in the seal member 112. The slit-type puncturing member is often used to puncture thick, rigid materials such as metal cans. In another embodiment, the saw-tooth puncturing member has a series of sharp teeth that are used to make a serrated hole in the seal member. The saw-tooth puncturing member is often used to puncture materials that are difficult to puncture with other types of puncturing members, such as multi-layered films.

FIG. 3 refers to a perspective view of the closure device 100 inserted into the open end of the container 10. The absorbent material 118 is secured by the closure device 100. For instance, the container 10 can store any oxygen-sensitive substances, such as wine with vital volatile aromatics. The blister 108 is pressed by a user to push the hollow shaft 110 downward, thereby penetrating the seal member 112. As a result, the primary gases from the body 102 and the secondary gas from the hollow shaft 110 are released into the headspace of the container 10, thereby forming a protective barrier within the headspace of the container 10. Since, the primary and secondary gases are heavier than the oxygen. Oxygen is pushed upward, toward the absorbent material 118 of the closure device 100, as the primary and secondary gases flow downward into the container 10. The oxygen is absorbed and removed from the container 10 by the absorbent material 118.

Figure 4:
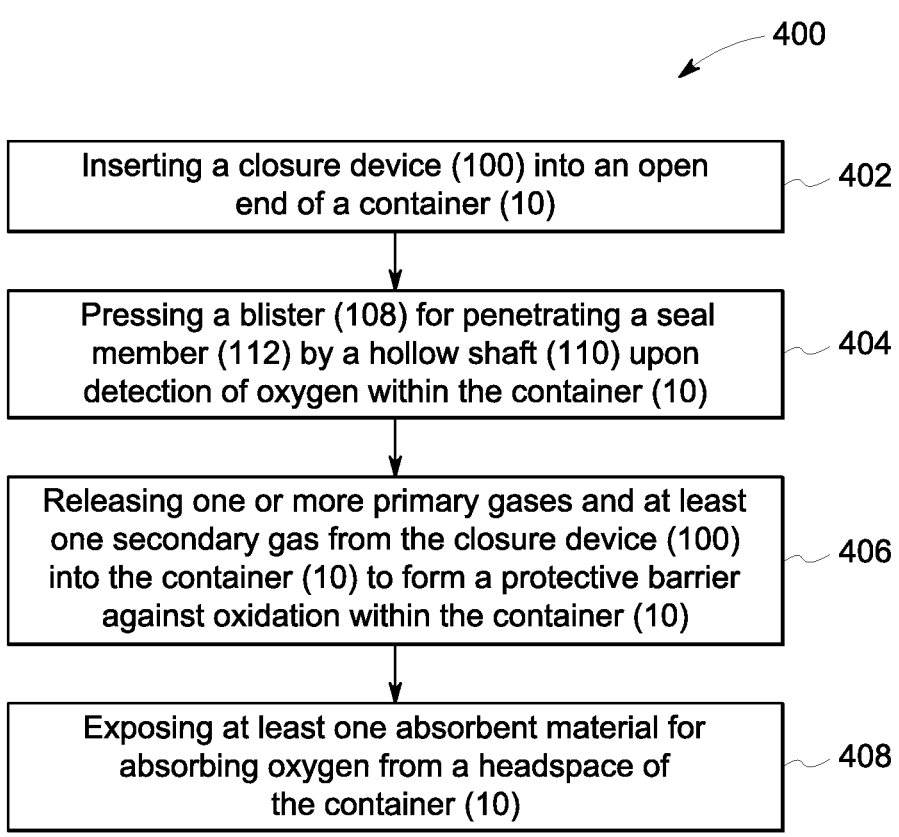
FIG. 4 illustrates a flowchart depicting a method for de-oxygenation of the container by the closure device, in accordance with embodiments of the invention.

FIG. 4 refers to a flowchart 400 depicting a method for de-oxygenation of the container 10 by the closure device 100. At step 402, the closure device 100 is inserted into the open end of the container 10 by inserting the body 102 into the open end of the container 10, as shown in FIG. 3. At step 404, the blister 108 is pressed to push the hollow shaft 110 in a downward direction to penetrate the seal member 112 by the hollow shaft 110. In specific, the indicator unit 120 monitors oxygen levels with a sensitivity of up to 0.01%. Upon detecting oxygen levels exceeding a predetermined threshold of 0.01%, the indicator unit 120 alerts the user through visual or audible means.

At step 406, as the seal member 112 is broken, the primary gases from the body 102, and the secondary gas from the hollow shaft 110 are released into the headspace of the container 10 to form the protective barrier within the container 10. At step 408, the absorbent material is exposed within the headspace for absorbing oxygen from the container 10.

In some embodiments, the closure device 100 provides combined protection of inert gas and oxygen scavenger methods. This means that it uses both inert gas and absorbent materials to protect the wine from oxygen exposure. The closure device 100 utilizes a less aggressive de-oxygenation agent than aggressiveness oxygenation agent such as ferrous/metal scavenger only which can create a partial vacuum within the headspace when oxygen is removed. This partial vacuum can displace the volatile aromatics inside the wine or juice creating a muted profile.

In some embodiments, the closure device 100 uses less aggressive agent that replaces oxygen with carbon dioxide which is another inert gas thus no vacuum is created within the headspace some non-ferrous oxygen scavengers such as ascorbic acid are known to have strong antioxidant capacity resulting in fruitier and fresher aromas and flavors of wines.

In some embodiment, the closure device 100 is specifically tailored for vessels like wine bottles. It is designed to fit snugly over the neck of the bottle and create a tight seal. This prevents oxygen from leaking into the bottle and degrading the wine. Further, the closure device 100 is a convenient and effective way to preserve opened wine. The closure device 100 uses a combination of inert gas and oxygen scavenger methods to protect the wine from oxygen exposure and preserve its quality and flavor.

In some embodiments, the closure device 100 is specifically tailored for wine bottles, which extends the shelf life of an opened wine bottle. The closure device 100 protects wine from oxygen exposure and preserves the fruitier and fresher aromas and flavors of wine.

In some embodiment, inert gas to blanket the exposed wine surface. This prevents oxygen from coming into contact with the wine, which causes oxidation. Inert gases such as argon are colorless, odorless, and tasteless, so they do not affect the flavor of the wine. The absorbent material to remove oxygen within the headspace of the wine bottle. The headspace is the empty space between the wine and the closure device 100. The absorbent material remove oxygen from the headspace, further preventing oxidation. In the case, the absorbent material is a non-ferrous absorbent material such as, but not limited to, ascorbic acid. Then, the non-ferrous absorbent material reacts with oxygen and absorb oxygen from the container 10 to release carbon dioxide which functions as the secondary inert gas to form the protective barrier.

Further, the closure device 100 provides non-invasive double action preservation systems, which do not displace volatile aromatics of the product, for example, wine out of the container 10 and thereby preserves the product's scents, flavors, and taste. Furthermore, the closure device 100 is designed for single use, which limits the potential for cross-contamination and improper use. The closure device 100 are a convenient and effective way to preserve wine for weeks after opening.

In some embodiments, the closure device 100 could increase wine sales for food and beverages (F&B) services in a few ways. The closure device 100 allows restaurants to feature more wines by the glass. This is because customers are more likely to order a glass of wine if they know that the unfinished bottle can be preserved for later consumption. This allows restaurants to offer a wider variety of wines to their customers, which can lead to increased sales. Further, the closure device 100 could encourage customers to order multiple bottles of wine. This is because customers could finish the bottles at their own pace, without having to worry about the wine going bad. This can lead to increased sales for restaurants, especially for high-end wines. The closure device 100 could improve the customer experience. Customers appreciate the ability to enjoy the same bottle of wine over multiple visits. This can lead to increased customer satisfaction and loyalty.

In some embodiments, the closure device 100 are a cost-effective way for wine educators, sommeliers, and wine students to re-taste opened wines or conduct multiple blind tasting exercises by saving or sharing unfinished bottles.

In some embodiments, the closure device 100 could assists wine distributors, wineries, and consumers reduce wine waste. Wine distributors and wineries could use the closure device 100 to preserve opened, unfinished bottles of wine. This can aids to reduce the amount of wine wasted for wine tasting, thereby save wine cost. Wine consumers could also benefit from the closure device 100. The wine consumers can open multiple bottles of wine at a time or open a bottle just for a glass, knowing that the unfinished wine will stay fresh for a long time. This can aid the wine consumers to enjoy their wine more and to reduce waste.

In some embodiments, in food packaging, the closure device 100 is used to introduce inert gas into containers holding oxygen-sensitive food items, such as fresh produce or dried goods. This helps to extend the shelf life of the food by preventing degradation caused by the oxygen exposure. In pharmaceutical packaging, the closure device 100 is employed to create an inert environment for medications that are susceptible to oxidation or degradation due to oxygen exposure. This ensures the preservation of the drug's efficacy and safety. In wine preservation, the closure device 100 is utilized to inject inert gas into wine bottles, preventing oxidation and preserving the wine's flavor and aroma. This allows wine enthusiasts to enjoy opened bottles for extended periods. In electronic component packaging, the closure device 100 is used to create an inert atmosphere around sensitive electronic components, protecting them from moisture and oxygen damage. This enhances the reliability and lifespan of the components.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

The invention claimed is:

1. A closure device for a container, comprising:
   a body defining a chamber for storing one or more primary gases and at least one absorbent material;
   a fastening member circumferentially extended around an outer surface of said body, wherein said fastening member is configured to create an airtight seal for an open end of said container upon insertion of said closure device through said open end;
   a blister positioned at one end of said body;
   a hollow shaft operably connected to said blister and disposed within said body, wherein said hollow shaft contains at least one secondary gas; and
   a seal member disposed at a bottom of said body,
   wherein, upon actuation of said blister, said hollow shaft penetrates said seal member, thereby simultaneously releasing said one or more primary gases from said chamber and said at least one secondary gas from said hollow shaft into said container to form a protective barrier against oxidation within said container, and exposing said at least one absorbent material to a headspace of said container for absorbing oxygen, whereby said closure device preserves products disposed within said container through a combined action of inert gas blanketing and oxygen absorption while maintaining said airtight seal.

2. The closure device of claim 1, wherein said at least one absorbent material is a de-oxygenation agent or an oxygen scavenging agent.

3. The closure device of claim 1, wherein said closure device is removably coupled to said open end of said container through a fastening assembly, wherein said fastening assembly includes at least one of a friction fit, a snap fit, a rotatable fit or screw fit, or any of a variety of fastening mechanisms.

4. The closure device of claim 1, wherein said closure device is made of a material includes at least one of plastic, silicone rubber, metal, natural cork, and synthetic cork.

5. The closure device of claim 1, wherein said closure device is made of a plastic material, which includes at least one of polyethylene terephthalate (PET), high-density polyethylene (HDPE), thermoplastic elastomer (TPE), polypropylene (PP), ethylene vinyl alcohol copolymer (EVOH), and polyamide (PA).

6. The closure device of claim 1, wherein said fastening member is made of a material that includes at least one of plastic, silicone rubber, and any flexible polymers.

7. The closure device of claim 1, wherein said fastening member comprises plurality of protrusions extended outward radially from a surface of said fastening member, wherein said plurality of protrusions is engaged with an interior surface of said container to ensure said airtight seal for said open end of said container.

8. The closure device of claim 1, wherein said hollow shaft defining a channel for storing said at least one secondary gas.

9. The closure device of claim 1, wherein said one or more primary gases and said at least one secondary gas are inert gases include at least one or a mixture of gases that are heavier than oxygen, which include at least one of argon gas, krypton gas, xenon gas, radon gas and carbon dioxide gas, wherein most preferably at least one primary gas comprise argon gas and said at least one secondary gas comprise carbon dioxide.

10. The closure device of claim 1, wherein said at least one secondary gas comprise argon gas.

11. The closure device of claim 1, wherein said at least one absorbent material includes at least one of metal-based substances and non-ferrous absorbent material, wherein said non-ferrous absorbent material absorbs oxygen within from said container to release said at least one secondary inert gas which is carbon dioxide to form said protective barrier.

12. The closure device of claim 1, wherein said closure device comprises an indicator unit for indication of the presence of oxygen in said container.

13. The closure device of claim 12, wherein said indicator unit includes at least one of a display and an oxygen indicator dye to measure oxygen levels present within said headspace of said container.

14. A closure device for a container, comprising:

a body defining a channel for storing one or more inert gases and at least one oxygen absorbing agent;

a fastening member circumferentially extended around an outer surface of said body, wherein said fastening member is configured to create an airtight seal for an open end of said container upon insertion of said closure device through said open end;

a blister with an indicator unit fixedly disposed on said body;

a hollow shaft operably connected to said blister and positioned within said body, wherein said hollow shaft is configured to contain at least one inert gas; and a seal member disposed at a bottom of said body, wherein actuation of said blister causes said hollow shaft to puncture said seal member, thereby releasing said one or more inert gases from said channel and said at least one inert gas from said hollow shaft into said container to establish an inert gas barrier and expose said oxygen absorbing agent to a headspace of said container, whereby oxidation of contents within said container is inhibited through coordinated inert gas displacement and oxygen absorption.

15. The closure device of claim 14, wherein said body, said blister, and said hollow shaft are made of a material that includes at least one of plastic, silicone rubber, metal, natural cork, and synthetic cork.

16. The closure device of claim 14, wherein said fastening member is made of a material that includes at least one of plastic, silicone rubber, and any flexible polymers.

17. The closure device of claim 14, wherein said fastening member comprises plurality of protrusions extended outward radially from a surface of said fastening member, wherein said plurality of protrusions is engaged with an interior surface of said container to ensure said airtight seal for said open end of said container.

* * * * *